United States Patent [19]

Sandmark

[11] 3,824,804

[45] July 23, 1974

[54] REFRIGERATING MACHINES
[76] Inventor: Carl Ake Sandmark, Osbyholm 28, 24200 Horby, Sweden
[22] Filed: Aug. 22, 1973
[21] Appl. No.: 390,511

[52] U.S. Cl.......................... 62/238, 62/332, 62/335
[51] Int. Cl............................................ F25b 25/02
[58] Field of Search...................... 62/238, 332, 335

[56] References Cited
UNITED STATES PATENTS

| | | | |
|---|---|---|---|
| 2,307,380 | 1/1943 | Baker............................... | 62/238 X |
| 2,781,644 | 2/1957 | Saposnikov et al............... | 62/332 X |
| 3,739,594 | 6/1973 | Freese.............................. | 62/238 X |

FOREIGN PATENTS OR APPLICATIONS

| | | | |
|---|---|---|---|
| 190,919 | 0/1965 | U.S.S.R............................. | 62/335 |
| 192,428 | 0/1956 | Germany........................... | 62/335 |

Primary Examiner—William F. O'Dea
Assistant Examiner—Peter D. Ferguson
Attorney, Agent, or Firm—Bierman & Bierman

[57] ABSTRACT

A refrigerating machine which is a combination of a compression type refrigerating apparatus and an absorption type refrigerating apparatus. The compression type refrigerating apparatus comprises a compressor, a condenser, a throttle valve and an evaporator connected in series so as to form a first closed loop. The absorption type refrigerating apparatus comprises a generator, a condenser, an evaporator and an absorber connected in series so as to form a second closed loop. The generator of the absorption apparatus is arranged as a heat exchanger for continuous transfer of heat from the cooling agent of the first loop, on the pressure side of the compressor, to the mixture of cooling agent and absorbent in the generator of the second loop. The evaporator of the absorption apparatus is connected as a heat exchanger for continuous cooling of the cooling agent of the first loop after the condenser of the compression apparatus on the input side of the throttle valve. By combining the generator and the compressor into a unit a decrease in temperature can be obtained in the outlet valve of the compressor.

1 Claim, 1 Drawing Figure

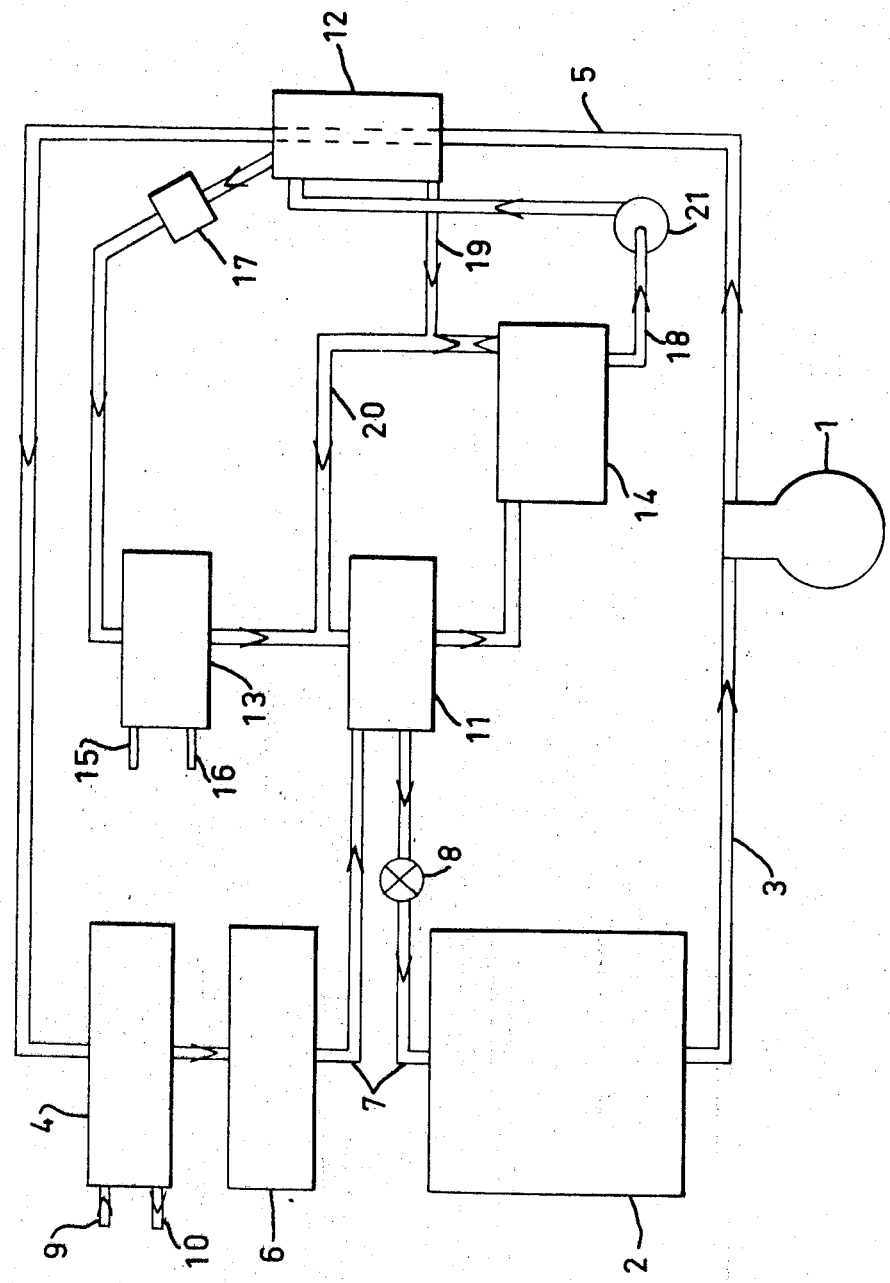

REFRIGERATING MACHINES

The present invention relates to refrigerating machines and, more particularly, to a novel refrigerating machine of a combined compression and absorption type.

It is a well-known fact that, for instance a compression type refrigerating machine during operation produces excess heat in dependence on the output of the machine. This heat must be removed. The removal is usually carried out by air or water cooling of the condenser of the machine. The excess heat is rarely used for heating purposes but in most cases it is completely lost as the cooling water is discharged into a sewage system and the cooling air is discharged into the atmosphere.

An object of the present invention is to provide, on the basis of the above conditions regarding excess heat, a refrigerating machine of substantially improved efficiency as compared with prior art machines.

This object is achieved by means of a refrigerating machine comprising a compression type refrigerating apparatus comprising at least a compressor, a condenser, a throttle valve and an evaporator connected in series so as to form a first closed loop and an absorption type refrigerating apparatus comprising at least a generator, a condenser, an evaporator and an absorber connected in series so as to form a second closed loop. The refrigerating machine according to the present invention is characterized in that the generator of the absorption apparatus is arranged as a heat exchanger for continuous transfer of heat from the cooling agent of the first loop, on the pressure side of the compressor, to the mixture of cooling agent and absorbent of the second loop, and in that the evaporator of the absorption apparatus is connected as a heat exchanger for continuous cooling of the cooling agent of the first loop after the condenser of the compression apparatus on the input side of the throttle valve. According to the invention it is advantageous if the generator is combined with the compressor in such a way that a decrease in temperature is obtained in the outlet valve of the compressor.

The invention will be more fully described hereinbelow with reference to the accompanying drawing which diagrammatically illustrates a preferred embodiment of the invention.

Referring to the drawing, the preferred embodiment of the refrigerating machine according to the present invention comprises a conventional compression type refrigerating apparatus. This apparatus includes a compressor 1 connected on its suction side to an evaporator 2 by a pipeline 3 and, on its pressure side, to a condenser 4 by a pipeline 5, the condenser 4 in its turn is connected with the evaporator 2 by a liquid receiver 6, a pipeline 7 and a throttle valve 8, such as for instance, a float valve or an expansion valve for obtaining the necessary control of the apparatus. For the discharge of the amount of heat absorbed by the cooling agent, primarily in the evaporator 2, and also of the condensation heat, the condenser 4 has a cooling coil, the inlet 9 and outlet 10 of which are shown in the drawing.

It is well known that additional cooling of the cooling agent between the condenser 4 and the throttle valve 8 produces an increased refrigerating effect in the evaporator 2, since in that case only a minor part of the cooling agent need be evaporated when passing through said throttle valve 8. For this additional cooling, which at most can be brought to the evaporation temperature, use has previously been made of a subcooler or heat exchanger operating with cooling water, the cooling being performed by means of the cold gas in the outlet of the evaporator 2. According to the present invention a more efficient cooling of the cooling agent is obtained before the expansion thereof and, thus, a further increased refrigerating effect, because an evaporator 11 in an absorption type refrigerating apparatus is connected as a heat exchanger in the pipeline 7 between the liquid receiver 6 and the throttle valve 8, whereby subcooling of the coolant is made possible to a desirable extent. Thus, the absorption refrigerating apparatus, which may be of any conventional type and which has, for instance, a system according to Carré or von Platen-Munter, comprises at least a generator 12, a condenser 13, an evaporator 11 and an absorber 14 connected in series so as to form a closed loop, as shown. Said condenser 13 is similar to the condenser 4 and has likewise an inlet 15 and an outlet 16 for cooling agent, e.g., water. The absorption type refrigerating apparatus which has, for instance, a system according to von Platen-Munter and uses ammonia, water and hydrogen, further comprises a rectifier 17, and pipelines 18, 19 and 20 for transferring respectively a concentrated solution from the absorber 14 to the generator 12, a less concentrated solution from the generator 12 to the absorber 14 and hydrogen from the absorber 14 to the evaporator 11. Furthermore, a pump 21, e.g., a thermosiphon pump, is connected to the line 18 to eliminate the level difference between the generator 12 and the absorber 14.

According to the present invention the generator 12 is arranged as a heat exchanger using the normally overheated gas of the compression refrigerating apparatus in the line 5 on the pressure side of the compressor 1 in order to perform the required heating of the cooling agent and the absorbent of the absorption apparatus.

It is easily understood that the combined compression-absorption aggregate according to the invention can substantially improve the refrigerating effect or, alternatively, in case of unchanged refrigerating effect, it permits reducing the size of the compression apparatus.

It should be emphasized that the absorption type refrigerating apparatus included in the refrigerating machine according to the invention does not require any additional supply of heat for its operation but can use the excess heat from the compression refrigerating apparatus.

Considering the fact that the function of the compression apparatus as well as of the absorption apparatus is so well known, no detailed description thereof is needed. The apparatuses according to the preferred embodiment described herein can obviously also be considerably modified within the scope of the invention.

What I claim and desire to secure by Letters Patent is:

1. A refrigerating machine comprising a compression type refrigerating apparatus comprising at least a compressor, a condenser, a throttle valve and an evaporator connected in series so as to form a first closed loop and an absorption type refrigerating apparatus comprising at least a generator, a condenser, an evaporator and an absorber connected in series so as to form a second closed loop, wherein the generator of the absorption apparatus is arranged as a heat exchanger for continuous transfer of heat from the cooling agent of the first loop, on the pressure side of the compressor, to the mixture of cooling agent and absorbent of the second loop, and in that the evaporator of the absorption apparatus is connected as a heat exchanger for continuous cooling of the cooling agent of the first loop after the condenser of the compression apparatus on the input side of the throttle valve.

* * * * *